(12) United States Patent
Schramm et al.

(10) Patent No.: US 6,324,447 B1
(45) Date of Patent: Nov. 27, 2001

(54) PROCESS AND DEVICE FOR STABILIZING A VEHICLE ON THE BASIS OF A DETERMINED TORSIONAL VALUE

(75) Inventors: Herbert Schramm, Leonberg; Ian Faye, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/486,347

(22) PCT Filed: May 20, 1999

(86) PCT No.: PCT/DE99/01508

§ 371 Date: Jun. 2, 2000

§ 102(e) Date: Jun. 2, 2000

(87) PCT Pub. No.: WO99/67113

PCT Pub. Date: Dec. 29, 1999

(30) Foreign Application Priority Data

Jun. 23, 1998 (DE) ............................................. 198 27 881

(51) Int. Cl.$^7$ ................................ G06F 17/00; G06F 7/00
(52) U.S. Cl. .............................. 701/1; 701/38; 280/6.159; 303/171
(58) Field of Search ............................. 701/1, 8, 38, 72, 701/93; 303/141, 143, 154, 171, 173; 280/6.159

(56) References Cited

U.S. PATENT DOCUMENTS

| | | | |
|---|---|---|---|
| 3,754,768 | * 8/1973 | Ellis et al. | 280/6.158 |
| 4,937,748 | * 6/1990 | Yonekawa et al. | 701/38 |
| 5,683,152 | 11/1997 | Hanbin . | |
| 6,192,305 | * 2/2001 | Schiffmann | 701/45 |

FOREIGN PATENT DOCUMENTS

| | | |
|---|---|---|
| 32 22 149 | 11/1983 | (DE) . |
| 35 35 843 | 4/1987 | (DE) . |
| 37 35 673 | 5/1989 | (DE) . |
| 44 16 991 | 11/1995 | (DE) . |
| 196 02 879 | 8/1997 | (DE) . |
| 0 758 601 | 2/1997 | (EP) . |
| 0 798 615 | 10/1997 | (EP) . |

\* cited by examiner

*Primary Examiner*—William A. Cuchlinski, Jr.
*Assistant Examiner*—Gertrude Arthur
(74) *Attorney, Agent, or Firm*—Kenyon & Kenyon

(57) ABSTRACT

A method for stabilizing a vehicle to avoid at least one of a vehicle rolling over about a vehicle axis oriented in the longitudinal direction of the vehicle and the vehicle sliding in the transverse direction. The method determines at least one of a torsion variable that corresponds to how the vehicle behaves in reaction to a force acting on the vehicle about the vehicle axis oriented in the vehicle's longitudinal direction, and a load-shift variable that corresponds to how the vehicle load behaves in reaction to a force acting upon the vehicle. The method determines a vehicle speed and also determines at least one threshold value for the vehicle speed based on the torsion variable and the load-shift variable. The vehicle speed and the at least one threshold value are then compared, and interventions (or measures) are taken to stabilize the vehicle based on the comparison.

10 Claims, 6 Drawing Sheets

PROCESS AND DEVICE FOR STABILIZING A VEHICLE ON THE BASIS OF A DETERMINED TORSIONAL VALUE

FIELD OF THE INVENTION

The invention relates to a method and a device for stabilizing a vehicle.

BACKGROUND INFORMATION

German Published Patent Application No. 44 16 991 A1 concerns a method and a device for warning truck drivers of the danger (or risk) of overturning (or rollover) when cornering. For this purpose, before the vehicle enters into a curve, on a straightest possible road segment before the curve, the type of vehicle and the status data relevant to the danger of overturning, such as the vehicle weight and the vehicle speed, are determined. Depending on the vehicle's center of gravity and the curve radius, the risk of overturning and the threshold (or limit) speed are determined. A signal requesting a reduction in speed is triggered if the vehicle's current speed shows cause for a risk of overturning, or if a preselected (or predetermined) safety margin with respect to the danger of overturning is encroached upon. For this purpose, a preselected safety margin of the permissible vehicle speed is specified with respect to the vehicle speed at the threshold of the danger of overturning.

With the system of German Published Patent Application No. 44 16 991 A1, one disadvantage may be that in the event of a danger of overturning, only a signal warning the driver is generated, instead of measures being carried out autonomously, i.e., independent of the driver, for reducing the vehicle speed and thus averting the risk of overturning. In this manner, under certain circumstances, a serious risk of overturning may not be promptly reacted to. Furthermore, in the determination of the risk of overturning, influences that are not considered include both torsion-dependant as well as load-shift-dependant, influences arising from forces acting on the vehicle.

German Published Patent Application No. 32 22 149 A1 concerns a device for avoiding sideways overturning of the vehicle. For this purpose, as a function of the track and the height of the center of gravity, a static stability is determined. From the latter, by multiplying two different safety factors, two permissible thresholds are determined. On the basis of the driving speed of the vehicle, the curve radius, and the gravitational acceleration, a dynamic instability is determined. In two comparisons, this dynamic instability is compared, in each case, with one of the two permissible thresholds. If the dynamic instability is greater than the first permissible threshold, the transmission clutch is released. If the dynamic instability is greater than the second permissible threshold, then the brakes of the vehicle are activated.

Also in the case of German Published Patent Application No. 32 22 149 A1 both torsion-dependant as well as load-shift-dependant influences arising from forces acting on the vehicle are not considered.

SUMMARY OF THE INVENTION

An object of an exemplary embodiment of the present invention is to provide devices and methods for stabilizing a vehicle such that in stabilizing the vehicle, on the one hand, the torsion behavior of the vehicle and, on the other hand, the shift of the load, due to forces acting on the vehicle, are considered. For this reason, in determining a threshold value for the vehicle speed, a torsion variable and/or a load-shift variable are considered.

The method according to an exemplary embodiment of the present invention is a method for stabilizing a vehicle. In particular, the goal is to avoid an overturning of the vehicle along a vehicle axis oriented in the longitudinal direction of the vehicle and/or a sliding of the vehicle in the transverse direction. For purposes of illustration, it should be noted: if a high transverse acceleration acts upon a vehicle at a high frictional value, then there is the danger of overturning. On the other hand, if there is a lower frictional value, then there is the danger of (or skidding) in the transverse direction.

The phrase "a vehicle axis oriented in the longitudinal direction of the vehicle" should be understood. On the one hand, the vehicle axis about which the vehicle has a tendency to overturn can be the actual vehicle longitudinal axis. On the other hand, it can be a vehicle axis that is offset by a given angle with respect to the actual vehicle longitudinal axis. In this context, it is insignificant whether the offset vehicle axis passes through the center of gravity of the vehicle. The case of the offset (or rotated) vehicle axis should also permit this type of orientation of the vehicle axis, in which the vehicle axis corresponds either to a diagonal axis of the vehicle or to an axis that is parallel to the latter. In addition, it should be noted that the phrase "sliding of the vehicle in the transverse direction" should also include the spinning of the vehicle.

In the method according to an exemplary embodiment of the present invention, a speed variable describing the vehicle speed and least one threshold value for the vehicle speed is determined. Since in the method according to an exemplary embodiment of the invention, on the one hand, the torsion behavior of the vehicle and, on the other hand, the shift of the load due to forces acting on the vehicle are to be taken into account, the at least one threshold value is determined at least as a function of the value of a torsion variable and/or of the value of a load shift variable. Based on the speed variable and the threshold value, a comparison is carried out, and, based on this comparison, interventions are carried out for stabilizing the vehicle. It should be noted that according to an exemplary embodiment of the invention, at least one threshold value should be determined. To illustrate that a threshold value can be selected from among many for the comparison, in the description, the threshold value, in the context of carrying out the comparison, is designated as the comparison variable.

The torsion variable characterizes how the vehicle behaves in reaction to a force acting upon the vehicle, in particular in reaction to a transverse force about a vehicle axis oriented in the longitudinal direction of the vehicle, and in particular to what degree the vehicle is turned and/or twisted and/or displaced due to a force acting upon the vehicle. For example, on the basis of the torsion variable, a rolling motion of the vehicle should also be determined. Since the torsion variable describes the behavior of the vehicle along a vehicle axis oriented in the longitudinal direction of the vehicle, it therefore also describes the displacement of the center of gravity of the vehicle about this axis. The displacement, of the center of gravity influences the behavior of the vehicle with respect to any existing danger of overturning or of skidding. Thus if the torsion variable of the vehicle is known, a more precise and therefore better stabilization of the vehicle can be effected. For this purpose, the at least one threshold value for the vehicle speed is determined as a function of the value of the torsion variable (or quantity). Since the torsion behavior of the vehicle to a large extent depends on the vehicle mass, the torsion variable is advantageously determined at least as a function of the mass variable (or quantity), which describes the mass of the vehicle.

The load-shift variable, which is determined particularly for vehicles having movable loads, (especially liquid loads), characterizes how the load of the vehicle behaves in reaction to a force operating on the vehicle, in particular in reaction to a transverse force, and in particular to what degree the load of the vehicle is shifted and/or displaced due to a force operating upon the vehicle. Since the risk of overturning and the risk of skidding of the vehicle is influenced by the shifting of the load transported by the vehicle especially during cornering, the load-shift variable is determined particularly for vehicles having movable loads (especially liquid loads). To take the load shift into account, the at least one threshold value for the vehicle speed is determined at least as a function of the value of this load-shift variable. The load-shift variable is determined at least as a function of a mass variable, which describes the mass of the vehicle. For example, in the case of a movable load, especially a liquid load. The volume of the load is determined as a function of this mass variable, and the load-shift variable is determined as a function of this volume. Additionally, the load-shift variable is determined as a function of a variable that characterizes the device present in the vehicle for taking on the load. In particular, the value of the variable that characterizes the device present in the vehicle for taking on the load is a function of at least of the form of this device. In vehicles that transport a liquid load, the volume of the liquid load can be determined directly, preferably during the loading or unloading operation of the device for taking on the load. The load-shift variable is then determined as a function of this volume.

Advantageously, a mass variable is determined that describes the mass of the vehicle. This mass variable is determined at least as a function of a variable that describes the tractive force operating on the vehicle and as a function of the variables describing the wheel speeds. The at least one threshold value for the vehicle speed is determined as a function of this mass variable. Since the forces operating on the vehicle during cornering, for example the centrifugal force, depend on the vehicle mass, the mass variable is directly included in the determination of the threshold value.

The method according to an exemplary embodiment the present invention is based on a speed comparison, which is carried out as a function of the speed variable and of the at least one threshold value. Since there must be at least one threshold value, in order to carry out the comparison a threshold value must be selected, and this one selected threshold value is designated as the comparison variable. Interventions or measures carried out to stabilize the vehicle occur as a function of this comparison. In the event that the prevailing speed variable is larger than the comparison variable, the vehicle speed in at least one wheel is reduced at least by retarder interventions and/or by engine interventions and/or by braking interventions to the point that the speed variable resulting from the interventions is smaller than or equal to the comparison variable. In this regard, the interventions are carried out advantageously as a function of the difference between the speed variable and the comparison variable.

Advantageously, two threshold values are determined, of which one is selected as the comparison variable. A first threshold value corresponds to a variable describing the danger of overturning of the vehicle. A second threshold value corresponds to a variable describing the danger of skidding of the vehicle, in particular the danger of skidding in the transverse direction. Consequently, with the assistance of the first threshold value, the danger of overturning of the vehicle is recorded and/or monitored and with the assistance of the second one, the danger of sliding or skidding of the vehicle is recorded and/or monitored.

Determining the second threshold value has the advantage that as a result, two different critical situations are recorded and/or monitored. One of the two threshold values is selected as the comparison variable for carrying out the comparison. It is advantageous if this is the threshold value that has the smaller value. As a result of the fact that the smaller of the two threshold values is selected as the comparison variable, it is assured that the stabilization of the vehicle is carried out for the situation in which the greater danger exists for the vehicle.

Since the second threshold value corresponds to a variable describing the danger of sliding of the vehicle, it is necessary in this regard to determine at least one frictional variable that, describes the frictional conditions between the tires and the road existing in the given driving situation. It is believed that it is advantageous to measure two frictional variables. A first one describes the instantaneous frictional coefficient, and a second one describes the difference of the frictional coefficient on the left side of the vehicle and on the right. In this way, differing frictional coefficients are determined on the basis of correspondingly different road conditions.

The distance of the vehicle center of gravity from the road may influence significantly the vehicle behavior with regard to a risk of overturning or a risk of sliding of the vehicle. Thus, for example, the danger of overturning of the vehicle during cornering is all the greater the higher the vehicle center of gravity is. For this reason, in the method according to an exemplary embodiment of the invention, a first height variable is determined, which describes this distance. This first height variable is determined at least as a function of the variables describing the wheel speeds. At least one threshold value for the vehicle speed is determined as a function of this first height variable.

Similarly, the distance between the road and a vehicle axis oriented in the longitudinal direction of the vehicle, about which the vehicle is turned and/or twisted and/or displaced in reaction to a force operating on the vehicle, in particular in reaction to a transverse force, determines the risk of overturning and of sliding of the vehicle. Thus, for example, the danger of overturning of the vehicle is greater if this axis lies higher. The higher this axis lies in the vehicle. In order to take this influence into account, a second height variable is determined, which describes the distance from the road of the axis described above. This second height variable is determined at least as a function of the mass variable, which describes the mass of the vehicle. At least one threshold value for the vehicle speed is determined as a function of this second height variable.

In addition to the variables described heretofore, a path variable is also of importance, which describes the radius of the path being driven at that instant by the vehicle, in particular the curve being driven at that instant by the vehicle, with respect to the danger of overturning and of sliding. The smaller the curve radius, at a constant vehicle speed, the greater the transverse forces acting on the vehicle, and the greater the danger of overturning or of sliding. For this reason, the threshold variables for the vehicle speed are determined as a function of this path variable. The path variable in turn is determined as a function of the speed variable and of a steering angle variable, which describes the steering angle of the vehicle.

The method according to an exemplary embodiment of the present invention has the advantage that, assuming the sensory mechanism that is present in a system for the feedback control of a variable describing the driving dynamics of the vehicle, no additional sensory mechanism is necessary. A system of this type for the feedback control of a variable describing the driving dynamics of the vehicle is discussed for passenger vehicles, for example, in the publication appearing in the Automotive Technical Journal (ATZ) 96, 1994, volume 11 on pp. 674 through 689 "FDR—Driving Dynamics Control in Bosch," or for commercial vehicles in the SAE Paper 973284 "Vehicle Dynamics Control for Commercial Vehicles."

The evaluation of the steering angle as an input variable in the method according to an exemplary embodiment of the invention has the following advantages: as a result of the steering angle specified by the driver, a cornering is initiated. As a consequence, by evaluating the steering angle already at a preliminary stage, i.e., before the actual situation of danger arises, it is possible to determine whether a risk of overturning or a risk of sliding exists for the vehicle. That is, if there should be a risk of this type, then stabilizing interventions can take place very quickly and thus in time. In other words, the evaluation of the steering angle corresponds to the realization of a so-called preview function. In addition, stabilizing interventions are only carried out during. That is during straight-line driving, stabilizing interventions, that are sensed to be disruptive, should be avoided.

DETAILED DESCRIPTION

First, FIGS. 1a and 1b will be discussed, which represent a one-part and a two-part road vehicle, respectively, in which the method according to an exemplary embodiment of the invention can be employed.

Figure 1A:
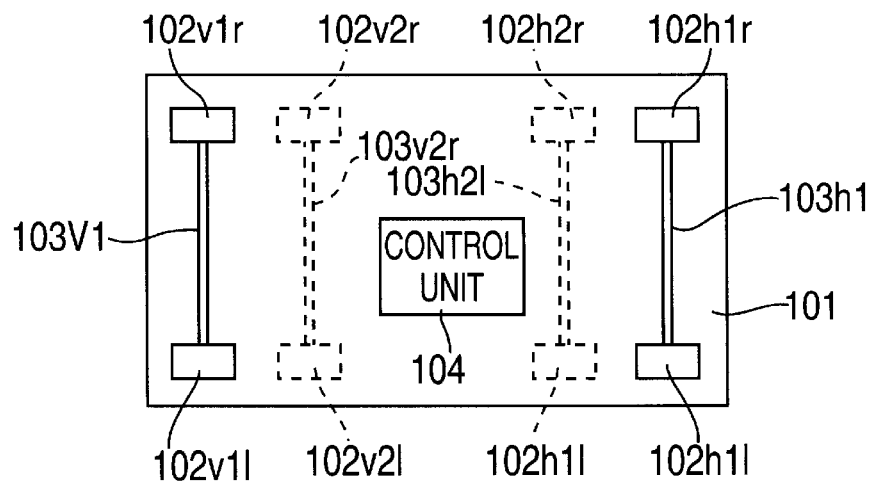
FIG. 1a shows a one-piece vehicle, with which a method according to an exemplary embodiment of the present invention may be used.

In FIG. 1a, a one-part vehicle 101 is depicted. This vehicle can be either a passenger car or a commercial vehicle. This vehicle should have at least two wheel axles, which is indicated by the partially dotted-line representation. The wheel axles of vehicle 101 corresponds to a designation 103$ix$, which uses an abbreviated notation for the wheel axles. Index i corresponds to whether an axle is a front axle (v) or a rear axle (h) and index x corresponds to a particular axle of the front or rear axles. In this context, the following correlation applies: in each case, index x having the smallest value is assigned to the front axle or the rear axle, respectively, which is closest to the vehicle boundary. The further the respective wheel axle is from the vehicle boundary, the greater is the value of associated index x. Thus, axles 103$v$1, 103$v$2, 103$h$2 and 103$h$1 are shown.

Wheel axles 103$ix$ have assigned to them wheels 102$ixj$. Index j indicates whether the wheel is located on the right (r) or on the left (l) side of the index x. Thus, wheels 102$v$1$r$, 102$v$1$l$, 102$v$1$l$, 102$v$2$r$, 102$v$2$l$, 102$h$2$r$, 102$h$2$l$, 102$h$1$r$ and 102$h$1$l$ are shown. In addition, vehicle 101 contains a control unit 104, in which the device according to an exemplary embodiment of the invention for carrying out the method according to an exemplary embodiment of the invention is implemented. In FIG. 1b shows a vehicle combination that includes a tractor 105 and a semi-trailer 106. FIG. 1b is not intended to be restrictive. A vehicle combination having a tractor and a towbar trailer, for example, may also be used. should have wheel axles 108$iz$, namely 108$vz$ and 108$hz$. Wheel axles 108$iz$ have assigned to them wheels 107$iz$, namely 107$vrz$, 107$vlz$, 107$hrz$ and 107$hlz$. Index z indicates that these are wheel axles and tractor wheels of the towing vehicle has a control unit 109, in which the method according to an exemplary embodiment of the invention is carried out and by which both tractor 105 as well as semi-trailer 106 are stabilized. Semi-trailer 106 has two wheel axles 108$ixa$. Both wheel axles 108$ixa$, namely 108$h$1$a$ and 108$h$2$a$, correspondingly, have assigned to them wheels 107$ixja$, namely 107$h$2$ra$, 107$h$2$la$, 107$h$1$ra$ and 107$h$1$la$. Index a indicates that the components are associated with components of semi-trailer 106. The number represented in FIG. 1b of wheel axles for tractor 105 and for semi-trailer 106 is not intended to be restrictive. Control unit 109 can also be arranged in semi-trailer 106 instead of in tractor 105. In addition, both tractor vehicle 105 as well as semi-trailer 106 may be provided.

Figure 1B:
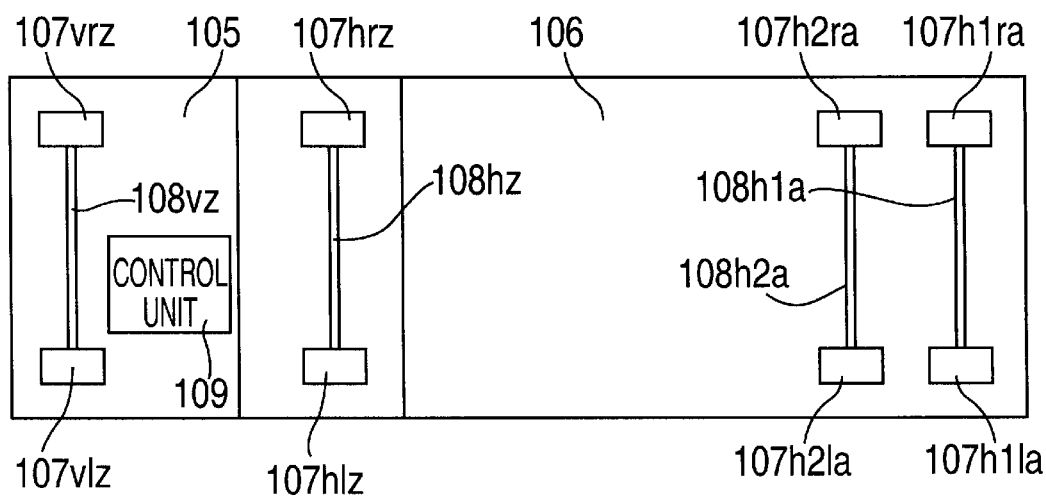
FIG. 1b shows a two-piece vehicle, with which a method according to an exemplary embodiment of the present invention may be used.

The indices a, i, j, x and z used in FIG. 1a and 1b are the same for all variable (or quantities) with which they are used.

In the following, FIGS. 2a through 2d are discussed. These Figures show, the conditions with which the method and device according to an exemplary embodiment of the present invention may be used.

Figure 2A:
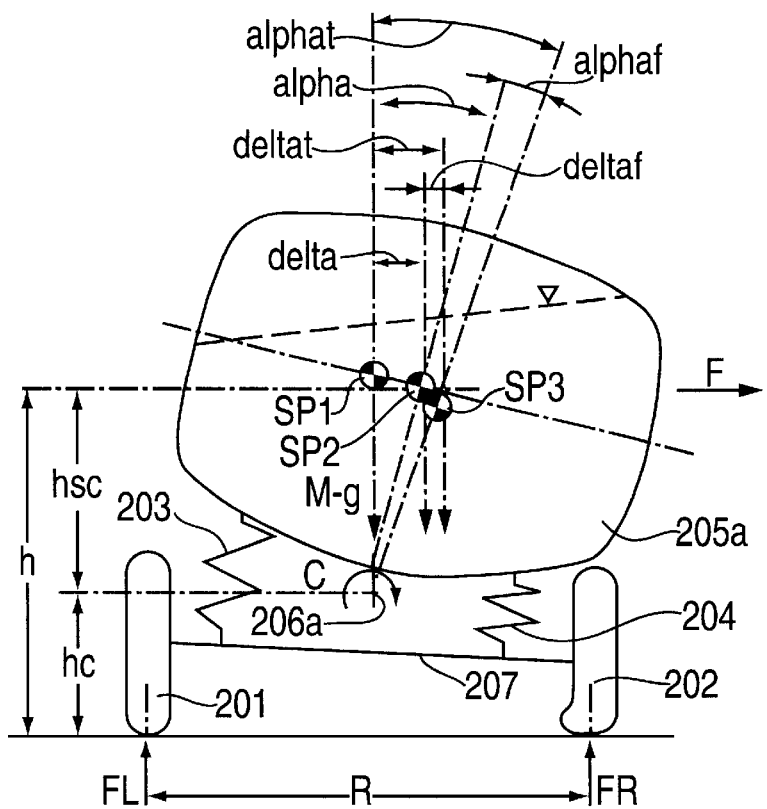
FIGS. 2a, 2b, 2c, and 2d show conditions for which the method and the device according to exemplary embodiments of the present inventions may be used with different types of vehicles, including commercial vehicles for transporting liquid and non-liquid loads, as well as passenger vehicles.

FIG. 2a depicts a vehicle for the transport of movable loads, in particular liquid loads. As an example in this regard, a tanker or a tanker tractor is cited. In the cutaway representation, wheels 201 and 202 can be seen; which, for example, are connected by an axle 207. Via suspension devices 203 and 204, a vehicle body shell 205$a$, in which the load to be transported is located, is connected to axle 207. The vehicle depicted in FIG. 2a is shown turning a corner to the left, and R designates the track of the vehicle.

In the vehicle depicted in FIG. 2a, both the influence of torsion, which is described by torsion variable C, as well as the influence of the load-shift, which is described by load-shift variable K, are depicted.

Variable h indicates the distance of the center of gravity of the vehicle from the road. The gravity acting on the vehicle at the respective center of gravity is designated by variable M·g. Variable hc indicates the distance between the road and a vehicle axle 206$a$ oriented in the longitudinal direction of the vehicle, about which the vehicle in reaction to a force acting upon the vehicle is turned and/or twisted and/or displaced. Variable hsc, which indicates the distance between the center of gravity of the vehicle and vehicle axle 206$a$ described above, can, for example, be determined from variable h and variable hc by subtraction. Additionally, C designates the torsion variable, that describes the behavior of the vehicle about vehicle axle 206$a$ described above in reaction to a force operating on the vehicle, in particular a transverse force. This force is indicated in FIG. 2a as force F. In this context, it is a question of the centrifugal force arising due to cornering. Forces FL and FR act upon the wheels of the vehicle.

SP1 depicts the center of gravity of the vehicle, as it would be, for example, during straight-line travel. Delta designates the torsion-dependent vertical shift of the center of gravity from SP1 to SP2, which is generated due to cornering. In this context, the vehicle with respect to axle 206a is displaced by angle alpha. The torsion-dependent shift or displacement has the load-dependent shift superimposed on it. The load-shiftdependent shift is designated by deltaf and the associated displacement by alphaf. This displacement causes the displacement of the center of gravity from SP2 to SP3. Overall, a shift or displacement results from deltat or alphat and thus a shift of the center of gravity from SP1 to SP3. In addition, forces FL and FR are changed by the torsion-dependent and load-shift-dependent shift or displacement such that the corresponding forces decrease on the inner wheels during cornering and the forces increase on the outer wheels during cornering.

On the basis of the depiction in FIG. 2a, it is clear that in commercial vehicles, due to the high-riding and changeable center of gravity situation, it is necessary to pay attention to the spatial behavior of the vehicle. Motor vehicles that transport liquid loads are particularly at risk. In addition to the torsion-dependent influences, it is also important to take note of the influences that arise on the basis of the displacement of liquid towards the outward side of the vehicle during cornering. The above discussion also applies to passenger cars. In this connection, reference should be made here already to FIG. 2d which has yet to be described.

At this point, it should be noted that above-mentioned torsion variable C includes all of the torsion-dependent influences acting upon the vehicle, i.e., torsion variable C describes the total torsional rigidity of the vehicle, which, for example, is includes of the individual torsional rigidities for the frame, the wheels, as well as the suspension devices.

Figure 2B:
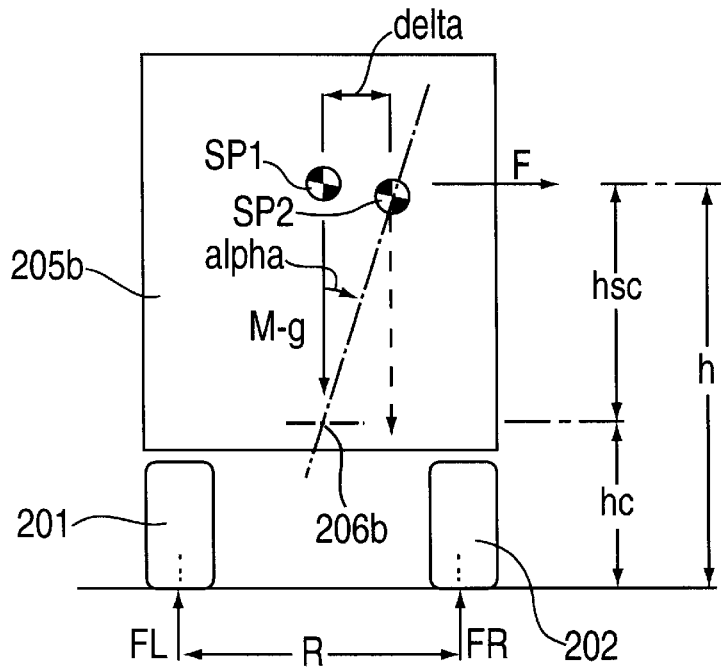

In FIG. 2b, a vehicle, in particular a commercial vehicle, is depicted which is used generally for transporting non-movable loads. For purposes of simplicity, the suspension devices were not depicted. Since in the case presented there can be no question of a load shift, or only to a negligible degree, the center of gravity is shifted or displaced from SP1 to SP2 only as a function of torsion. However, due to the heavy loads of the vehicle that may vary, a change in the center of gravity situation and therefore at least a change in variables hsc and h occurs.

Figure 2C:
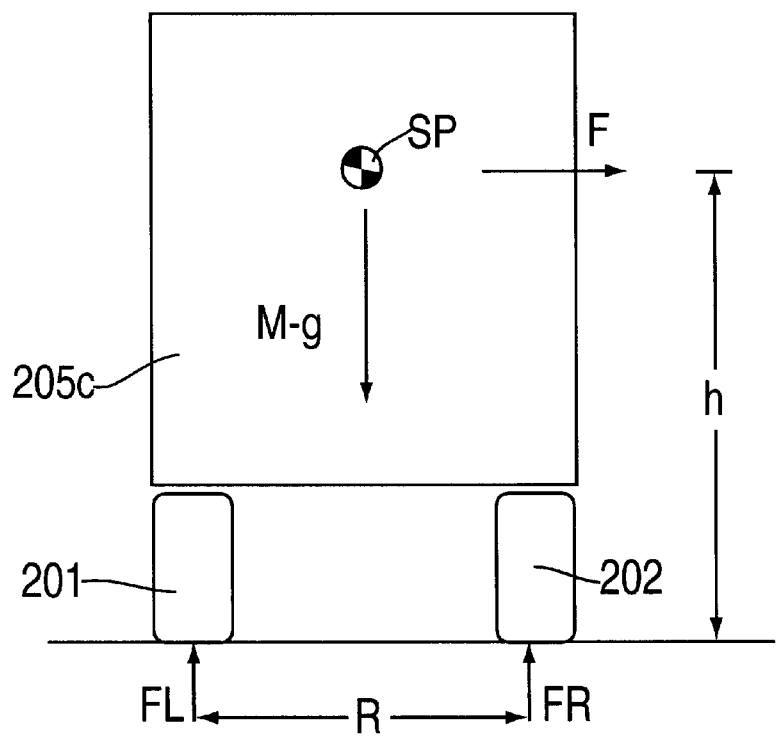
Figure 2D:
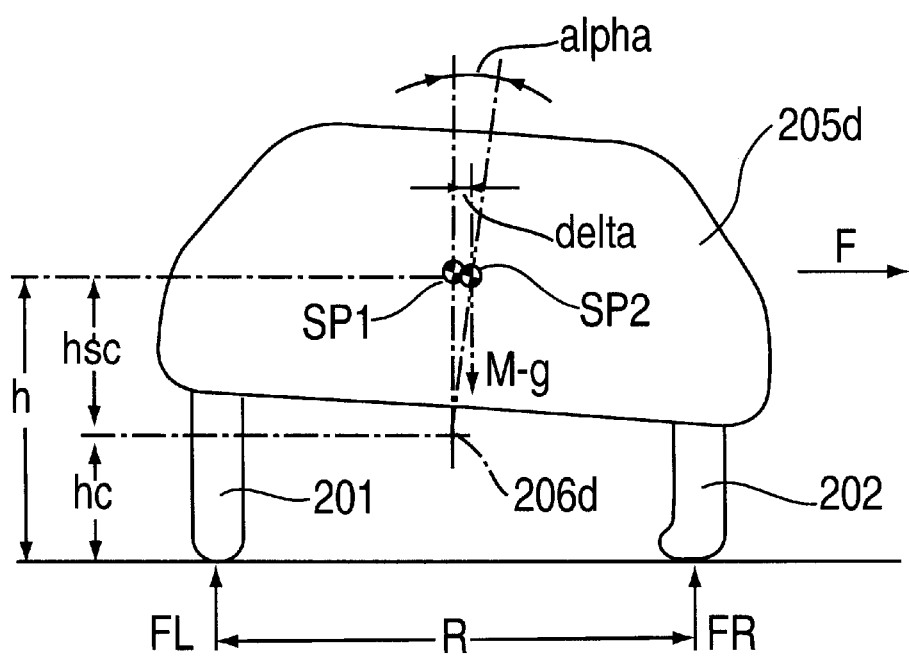

In accordance with the representation in FIG. 2b, the same situation is depicted in FIG. 2d for a passenger car. In a passenger car, first and foremost the torsion-dependent shift or displacement of the center of gravity is to be expected. A load-dependent shift seldom occurs, for example, in the case of pickup trucks or other small transport vehicles.

FIG. 2c shows a vehicle that has neither a torsion-dependent nor a load-shift-dependent shift or displacement of the center of gravity.

The representation of various vehicles in FIGS. 2a through 2d seeks to portray the fact that the method according to an exemplary embodiment of the invention is applicable to any and all vehicles. Thus the method according to an exemplary embodiment of present invention is applicable to vehicles in which a torsion-dependent or load-shift-dependent displacement or shift of the center of gravity can arise. Similarly, the method according to an exemplary embodiment of the present invention is applicable to vehicles in which only a torsion-dependent shift or displacement of the center of gravity can arise. Furthermore, the method according to an exemplary embodiment of invention is applicable to vehicles in which neither a torsion-dependent nor a load-shift-dependent displacement or shift of the center of gravity arises. The method according to an exemplary embodiment of invention, for example, can also be used in buses.

Figure 3:
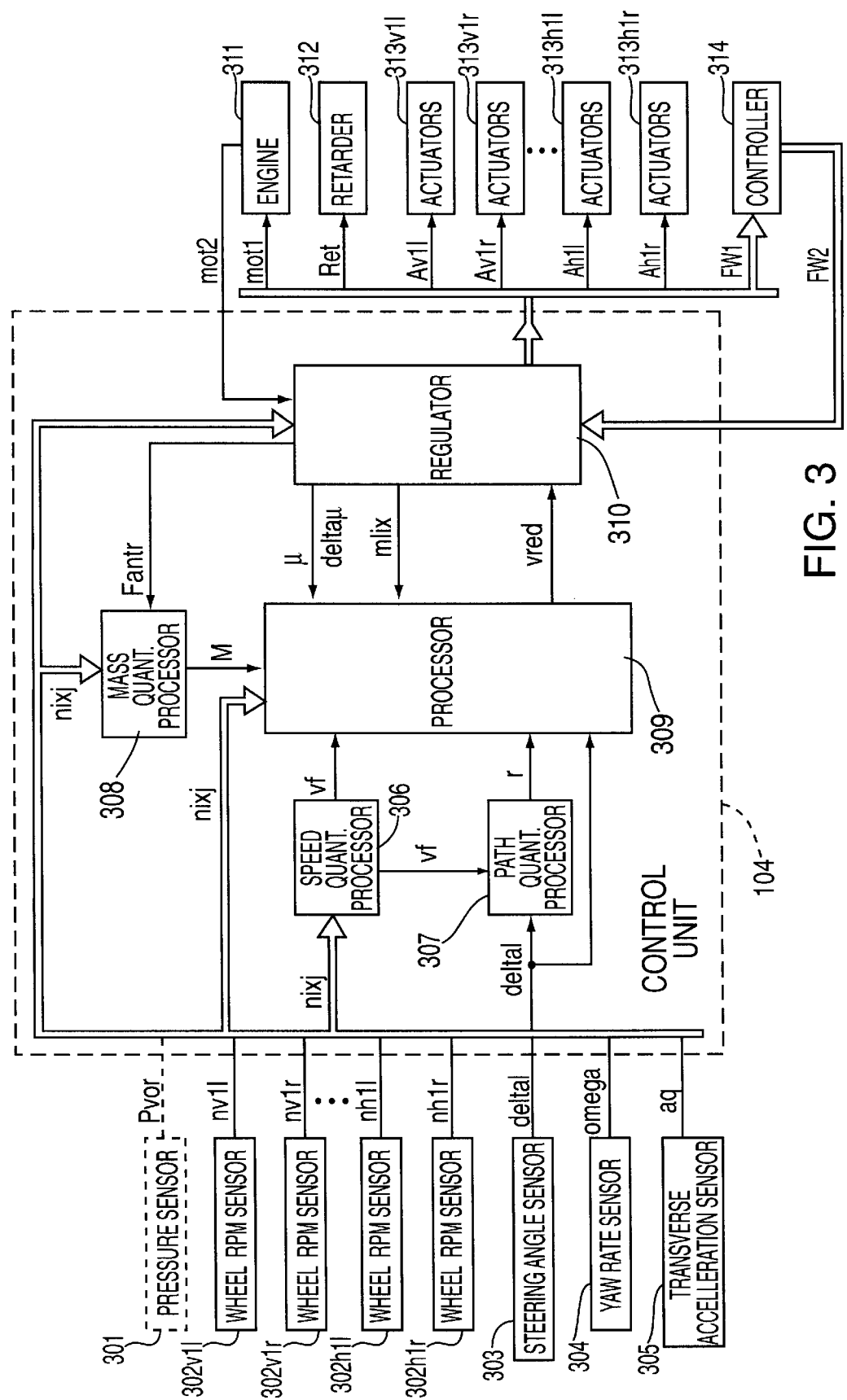
FIG. 3 shows a system for performing a method according to an exemplary embodiment of the present invention.

FIG. 3 is based on a one-part vehicle, such as is depicted, for example, in FIG. 1a. For this reason, in FIG. 3, control unit 104 is included. This representation, however, is not intended to be restrictive since exemplary embodiments of the present inventions, for example, are also applicable to a vehicle such as is depicted in FIG. 1b. Of course on the basis of FIG. 3, corresponding modifications may be necessary.

It is assumed that the one-part vehicle has at least two wheel axles, a front axle 103v1 having wheels 102v1r and 102v1l as well as a rear axle 103h1 and wheels 102h1r and 102h1l. Wheel speed sensors 302i1j associated with these wheels are depicted in FIG. 3. Depending on the number of wheel axles used in the one-part vehicle, as is indicated in FIG. 3, further wheel speed sensors 302ixj, namely 302v1l, 302v1r, 302h1l and 302h1r, are added. Using wheel speed sensors 302ixj, variables nixj, namely nv1l, nvlr, nhlr and nh1l, are determined that describe, in each case, the wheel speed of corresponding wheel 102ixj. Variables nixj are fed to blocks 306, 308, 309, and 310. Wheel speed sensors 302ixj are present regardless of the type of regulator 310.

In addition, the vehicle includes a sensor 303, with which a steering angle variable deltal, which describes the steering angle of the vehicle, is determined. This sensor 303 is also present regardless of the type of regulator 310. Steering angle variable deltal is fed to a block 307, a block 309, and block 310.

Block 310 represents the regulator or vehicle regulator that is implemented in control unit 104. This regulator 310 is generally a slip regulator. In this context, this slip regulator can be designed, for example, as a brake slip regulator and/or as an anti-slip regulator. In the present exemplary embodiment, it is to be a slip regulator or a regulator, which in its basic function regulates a variable describing the driving dynamics of the vehicle, for example a variable that is dependent on the transverse acceleration and/or the yaw rate of the vehicle, at least based on interventions or measures taken with the wheel brakes and/or in the engine. At this point, reference is made to the above-mentioned publication "FDR—Driving Dynamics Control of Bosch" and to the SAE paper 973284, in which a system for regulating a variable describing the driving dynamics of the vehicle is discussed.

Block 310 will be discussed in greater detail below. Block 310 is already mentioned at this point with respect to the sensory mechanism, still to be described. Since block 310, as was already mentioned above, is to be a regulator for regulating a variable describing the driving dynamics of the vehicle, further sensors are needed to provide this regulation. Depending on the braking system present in the vehicle, a sensor 301 is required with which a pressure variable Pvor is determined, which describes the initial pressure set by the driver. The broken line depiction is to indicate that sensor 301 is necessary in a hydraulic braking system, whereas in a pneumatic braking system, it is not necessary. Similarly, a sensor 304 for measuring yaw rate omega of the vehicle as well as a sensor 305 for measuring transverse acceleration aq acting on the vehicle, are necessary. The variables determined by sensors 301, 304, and 305 are fed to block 310. It should be once again mentioned at this point that sensors 301, 304, and 305 are not absolutely necessary. If a different type of regulator or slip regulator is realized in block 310, then these sensors may be omitted entirely.

In block 306, in a familiar manner, a variable vf describing the speed of the vehicle is determined from wheel speeds nixj, variable vf being fed to blocks 307 and 309. In block 307, based on vehicle speed vf and steering angle variable deltal, a path variable r is determined that describes the radius of the path being driven at that moment by the vehicle, in particular the curve being driven at that moment by the vehicle. Variable r, for example, is determined using the equation:

$$r = \frac{1 + \left(\frac{vf}{vch}\right)^2}{deltal} \cdot il \cdot l$$

In equation (1), variable il stands for the total steering ratio, variable vch represents a characteristic speed for the vehicle, and variable l represents the wheel base. Variable r is fed to block 310.

In addition to the aforementioned variables nixj, a variable Fantr is fed to blocks 308, proceeding from block 310. This variable describes the motive force acting on the vehicle. It is determined in block 310 in a familiar manner at least as a function of variables describing the engine performance, the engine speed being mentioned here as an example. In block 308, proceeding from the variables fed to it, a mass variable M describing the mass of the vehicle is determined. This mass variable is fed to block 309.

In block 309, proceeding from a speed comparison, it is determined whether a reduction of the vehicle speed is necessary, so that the vehicle does not overturn about the vehicle axis oriented in the longitudinal direction of the vehicle and/or that the vehicle does not slide in the transverse direction. For carrying out this speed comparison, already-mentioned variables M, nixj, vf, r, and deltal are fed to block 309. In addition, two frictional variables $\mu$ and delta$\mu$ and variables mlix are fed to block 309 proceeding from block 310. Both variables $\mu$ and delta$\mu$ represents frictional variables, which describe the frictional conditions between the wheels on the road existing in the given driving situation. Variable $\mu$ describes the frictional value obtaining at that instant. It is estimated in block 310, for example, as a function of the longitudinal acceleration and the transverse acceleration. Variable delta$\mu$ describes the difference between the frictional value on the left and on the right side of the vehicle. In a braking procedure, variable deltas is determined in block 310, for example, as a function of the wheel braking cylinder pressures and the wheel speeds. In this connection, reference should be made to German Published Patent Application No. 35 35 843 A1. Alternatively, variable delta$\mu$ can be determined in block 310 also as a function of the engine torsion and the wheel speeds. In this regard, reference should be made, for example, to German Published Patent Application No. 37 35 673 A1.

Variables mlix represent the axle-specific wheel loads. They are determined in block 310 in a familiar manner, for example, from the wheel speeds.

The result of the speed comparison is generated using the variable vred. In this context, for example, the following correlation applies: if it is necessary to reduce the vehicle speed, value TRUE is assigned to variable vred. On the other hand, if no reduction in the vehicle speed is necessary, then value FALSE designed to variable vred. Variable vred is fed to block 310. Carrying out the speed comparison is discussed in detail in connection with FIGS. 4 and 5.

As was mentioned above, block 310 represents the vehicle regulator implemented in the control unit. This vehicle regulator is, for example, a regulator for regulating a variable describing the driving dynamics of the vehicle, as is discussed in the above-mentioned publication "FDR—Driving Dynamics Control in Boscht" and in the SAE Paper 973284. This regulation of the variable describing the driving dynamics of the vehicle is carried out by regulator 310 in its basic function, as a function of the variables determined with the assistance of sensor 301 (if present) and of sensors 302ixj, 303, 304, and 305, as well as of variable mot2, which, for example, describes the engine speed or the engine torsion of engine 311.

On the basis of the variables discussed above, regulator 310 determines the control signals at least for engine 311 and actuators 313ixj, for realizing the slip regulation implemented in regulator 310 as its basic function. For controlling engine 311, a variable mot1 is determined in block 310 and is fed to the engine. This variable mot1 represents, for example, the throttle setting to be determined. For actuators 313ixj, which, for example, are configured as wheel brakes, variables Aixj are determined in block 310 and are fed to the corresponding actuator. Variables Aixj represent, for example, the control signals for the valves associated with the wheel brakes. A retarder 312 can be provided in addition to actuators 313ixj. For controlling the retarder, a variable Ret is determined in block 310 and is fed to the retarder.

It should be mentioned at this point that the braking system can be a hydraulic or an electrohydraulic or a pneumatic or an electropneumatic or an electromechanical one.

In addition to the regulation feature implemented in regulator 310 as its basic function, regulator 310 has the task of stabilizing the vehicle so that an overturning of the vehicle with respect to the vehicle axes oriented in the longitudinal direction of the vehicle or a sliding of the vehicle in the transverse direction is avoided. In the context of this stabilization, the regulator accomplishes two tasks: first, in the event that value TRUE is assigned to variable vred, corresponding control signals for engine 311, actuators 313ixj, retarder 312, and controller or controlling means 314 from the related art for influencing the chassis are generated so that the aforementioned overturning or sliding is avoided. For controller or controlling means 314, regulator 310 generates a variable FW1. At the same time, proceeding from means 314, regulator 310 has fed to it an a quantity FW2, which describes the instantaneous settings of the chassis and which is necessary in regulator 310 as a checkback signal for the regulation. The control for avoiding the overturning (or rollover) or the sliding can be overridden by the control taking place in accordance with the basic function. Or the control according to the basic function is suppressed for the time during which a control for avoiding the overturning or sliding is carried out. Second, in regulator 310, the above-mentioned variables $\mu$, delta$\mu$, mlix, and Fantr are determined and are fed to the corresponding blocks.

Figure 4:
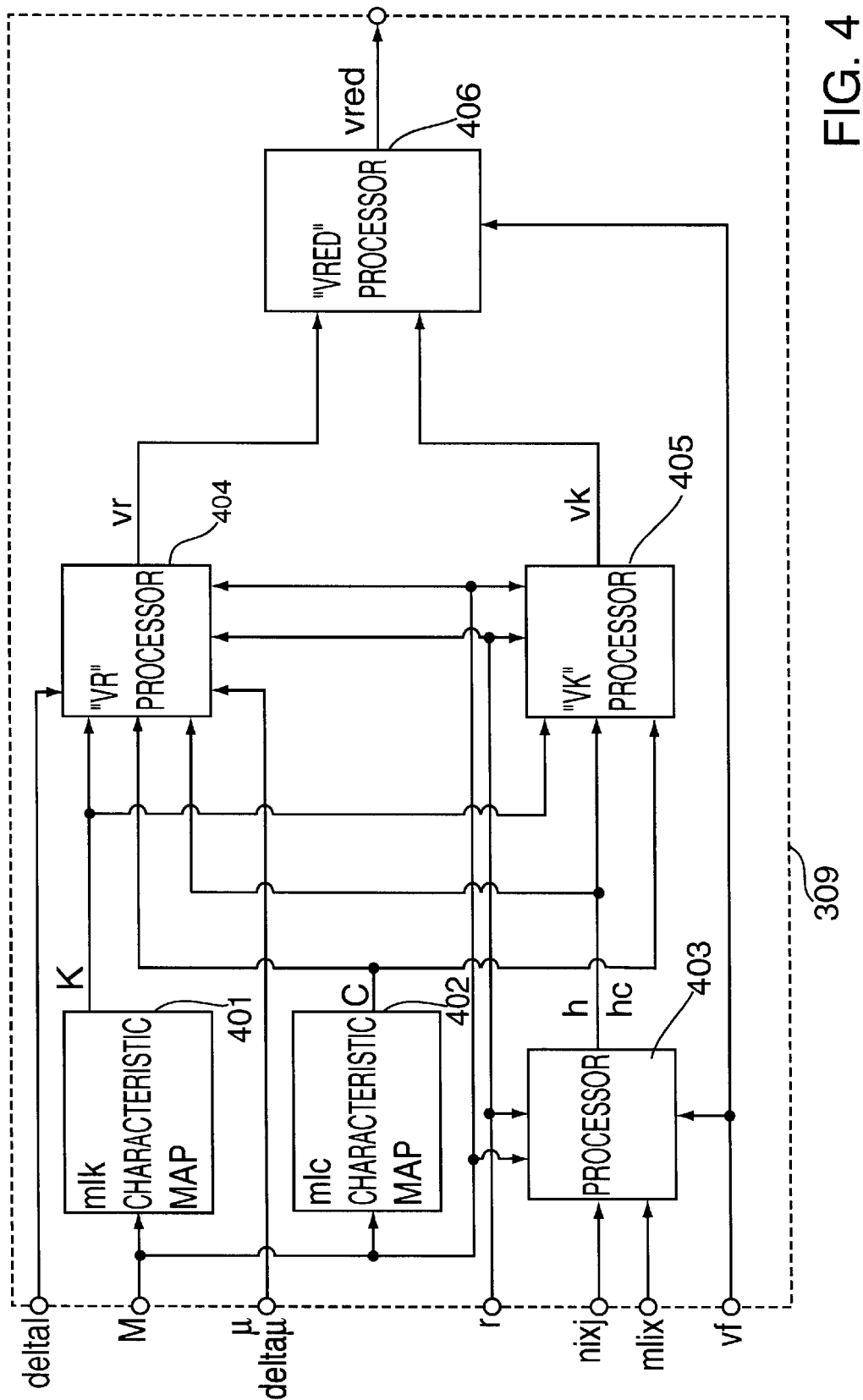
FIG. 4 shows a processor of the system of FIG. 3.

In the following, FIG. 4 is discussed, in which block 309 is depicted in greater detail.

In block 401, proceeding from mass variable M, load-shift variable K is determined, which is fed both to a block 404 as well as to a block 405. The determination of load-shift variable K proceeds, for example, in the following way: in the preliminary stage, for a vehicle or a vehicle combination, composed of a tractor and a trailer or semi-trailer, and for a known load or for a liquid having a known density, variable K is determined by driving tests as a function of vehicle mass M. From the value pairs of variables K and M, a characteristics map (field) is generated which is stored in block 401. Thus as a function of the value of variable M, fed to block 401, a value for variable K is determined. The determination of variable K is only suitable as a function of the vehicle mass when the tractor is operated using a known semi-trailer or trailer, and when the density of the liquid load is known.

The determination of variable K can be improved such that variable K can be determined for any and all vehicle combinations and any and all loads, i.e., for a liquid of any density. This is based on the following. On the one hand, variable K to a great degree is a function of the given trailer or semi-trailer, since depending on the form of the device present for taking on the load, a varying capacity for displacement of the liquid and thus of the center of gravity will result. On the other hand, variable K greatly depends on how great the volume of the load is which can be displaced during the driving. For example, a tanker having a tank that is 20% filled has a greater displacement of the center of gravity than a tanker having a tank that is 70% filled. Consequently, especially with liquid loads, the density of the load has great significance because, if the mass is given, it also determines to a great extent the volume of the load and thus the potential displacement of the center of gravity. Consequently, provision can be made to store various characteristics maps (fields) in block 401 as a function of the semi-trailer or trailer used and as a function of the volume of the load. To determine variable K, however, it would be necessary to have recognition in the control unit of the semi-trailer or trailer, and the density of the load would have to be communicated in an appropriate manner to the control unit. As a function of the trailer or semi-trailer recognized and as a function of the load volume determined, variable K can then be determined in block 401. The load volume is determined, given a known mass of the empty vehicle, from the vehicle mass and the density of the load. Alternatively, the volume of the liquid load can also be directly determined during the loading or unloading operation of the device for taking on the load. This is possible due to the fact that, for example, tanker tractors have display devices, which display the volume of the liquid load being taken on or being discharged. For determining the current volume value, it is only necessary to add the supplied volume or the discharged volume to the previous volume value that is stored advantageously in the control unit, or to subtract from it.

With respect to the problem of load-shift, reference should be made at this point to the article entitled "The Threshold of Overturning in Articulated Vehicles Having Solid and Liquid Loads" by H. Isermann appearing in the journal "German Motor Vehicle Research and Traffic Technology," Volume 200, by the VDI Printing House, Dusseldorf, 1970.

Alternatively, in the case of a liquid load of unknown density, provision can be made that for this liquid a reference density is assumed, and determination of variable K is carried out with the assistance of this reference density. In his context, however, it should be noted that the reference density is selected so that any potential threatening danger of overturning or of sliding can still realistically be estimated.

In a block 402, as a function of variable M, torsion variable C is determined, which is fed both to a block 404 as well as to a block 405. The determination of torsion variable C proceeds in accordance with load-shift variable K. In the preliminary stage, for a vehicle or a vehicle combination, variable C is determined through driving tests as a function of vehicle mass M. From the value pairs of variables C and M, a characteristics map (field) is generated, which is stored in block 402. Thus as a function of the value of variable M, fed to block 402, the value is determined for variable C. The determination of the characteristics map (field) in the preliminary stage can be supported by simulation calculations. An improvement of the determination of variable C with respect to any and all vehicle combinations can be achieved in accordance with load-shift variable K.

In a block 403, first height variable h and second height variable hc are determined. The determination of first height variable takes place, for example, in the following way: first, as a function of vehicle speed vf, wheel speeds nixj, and path variable r, dynamic rolling radii are determined which describe the performance of the specific wheel. Proceeding from these dynamic rolling radii, and taking into account the axle-specific wheel loads mlix, vehicle speed vf, and path variable r, first height variable h, which corresponds to the height of the center of gravity, is determined. The determination of second height variable hc takes place with the assistance of a characteristics map (field). This characteristics map (field) is also determined in the preliminary stage, for example by driving tests, as a function of variable M. Using supplied variable M, a value for the second height variable is determined in block 403. Both height variables h and hc are fed both to block 404 as well as to block 405. Furthermore, path variable r and mass variable M are also fed to blocks 404 and 405. In addition, first frictional variable $\mu$ and second frictional variable delta$\mu$ are fed to block 404.

In block 404, second threshold value vr is determined as a function of the variables fed to block 404 and is fed to block 406. Generally, i.e., if the torsion-dependent and the load-shift-dependent influences are taken into account, this second threshold value vr is generated, for example, in accordance with the equation $$vr = \sqrt{\frac{g \cdot R \cdot C \cdot r \cdot \left(\mu r - \frac{1}{2} delta\mu\right)}{R \cdot C - delta\mu \cdot (hc + hsc \cdot M \cdot g + K \cdot C \cdot g)}} \ . \quad (2)$$

The equation (2) applies to the vehicle depicted in FIG. 2a, which shows the state of affairs when a vehicle corners left. In the equation (2) variable g corresponds to the gravitational constants (9.81 m/s$^2$) and variable R corresponds to the track width. The variable ar describes the frictional value on the right side of the vehicle and is determined proceeding from frictional variables $\mu$ and delta$\mu$. Variable hsc describes the distance of the vehicle center of gravity from the vehicle axis oriented in the longitudinal direction of the vehicle, e.g., 206a in FIG. 2a, about which the vehicle turns and/or twists and/or is displaced in reaction to a force operating on the vehicle. Variable hsc is determined from the first and the second height variable. For a right-hand curve, equation (2) applies accordingly, but in place of $\mu r$, in this case $\mu l$ should be used, which is similarly determined proceeding from frictional variables $\mu$ and delta$\mu$. The determination as to whether it is a left or a right-hand curve, is undertaken as a function of the steering angle variable deltal fed to block 404.

If a vehicle is observed that is not transporting a movable load and therefore no load-shift-dependent influences are present or in which the load-shift-dependent influences are negligible, then variable vr is determined in accordance with a simpler equation, which is yielded from equation (2) for K=0. This should apply, for example, for the vehicles of FIGS. 2b and 2d. If no differing frictional values occur simultaneously on the left and on the right side of the vehicle, then the equation for determining vr from the equation (2) for K=0 and for delta$\mu$=0 results. In the event that no torsion-dependent and no load-shift-dependent influences are present simultaneously and that no differing frictional values are present between the left and right side of the vehicle, variable vr is determined in accordance with an equation that results from equation (2) for K=0, delta$\mu$=0, and C=∞. This should apply, for example, to the vehicle depicted in FIG. 2c.

In block 405, first threshold value vk is determined as a function of the variables fed to block 405 and is fed to block 406. In general, i.e., when the torsion-dependent and the load-shift-dependent influences are taken into account, this first threshold value vr, for example, is yielded in accordance with the equation $$vk = \sqrt{\frac{g}{2} \cdot \frac{R \cdot C \cdot r}{g \cdot hsc \cdot M + K \cdot C \cdot g + h \cdot C}} \cdot \quad (3)$$

Equation (3) applies to the vehicle depicted in FIG. 2a. Apart from the explanations with respect to the two frictional values, the explanations presented above for equation (2) apply to equation (3) accordingly.

The cases discussed above, which, proceeding from the equations (2) and (3) lead to differing determination equations for threshold values vr and vk, are determined by determining the variables fed to block 309. Alternatively, provision can be made, if, for example, it is known for a vehicle combination that it is not used for transporting liquid loads, to store the corresponding simplified equation in blocks 404 and 405.

In addition to two threshold values vr and vk, vehicle speed vf is also fed to block 406. As a function of these variables, it is determined whether a stabilization is necessary for the vehicle. The result of this determination is output with the assistance of variable vred. First, in block 406, from the two threshold values vr and vk, the threshold value having the smaller value is selected as the comparison variable. Vehicle speed vf is compared with this comparison variable. If vehicle speed vf is greater than the comparison variable, this is an indication of an unstable condition of the vehicle and a stabilization of the vehicle is necessary. Value TRUE is assigned to variable vred. If, on the other hand, the vehicle speed is smaller than the comparison variable, then this is an indication of a stable condition of the vehicle and a stabilization of the vehicle may not be necessary. Accordingly, value FALSE is assigned to variable vred.

Figure 5:
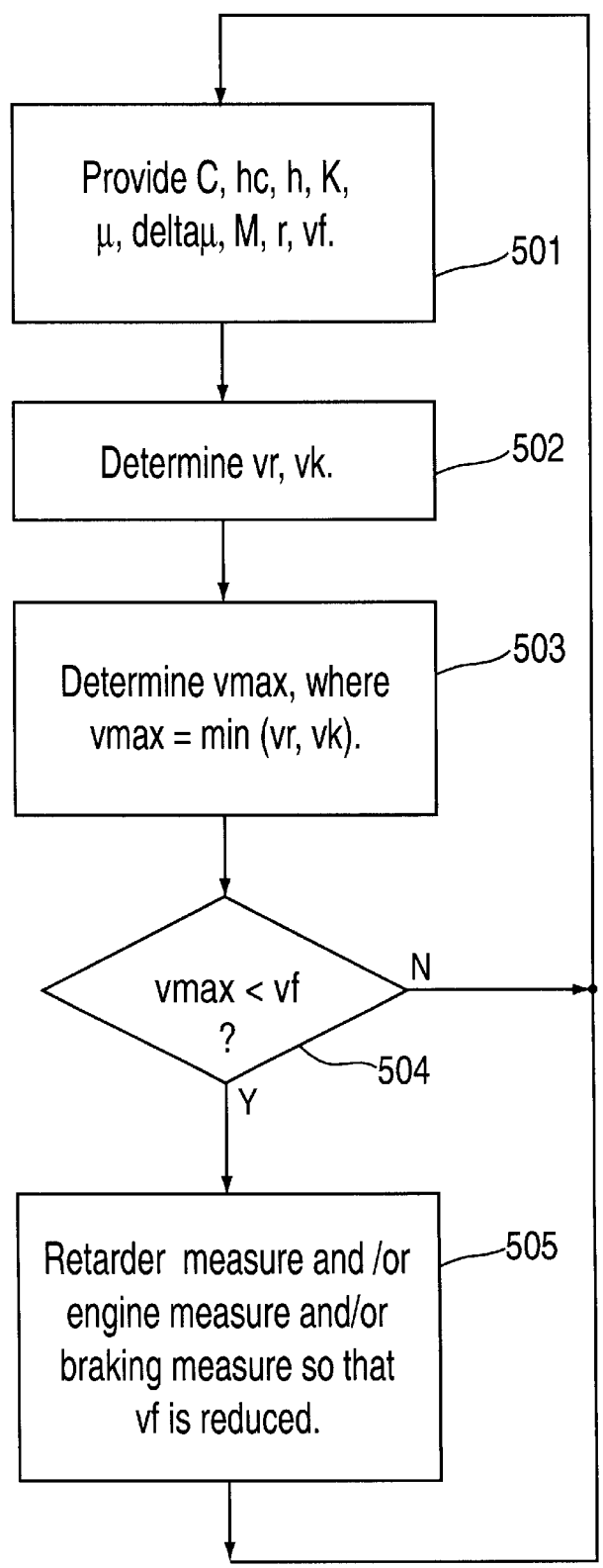
FIG. 5 shows a flow-chart of the method according to an exemplary embodiment of the present invention.

FIG. 5 shows a flowchart of the sequence of the method according to the invention. The method the invention begins with a step 501, in which variables C, hc, h, K, $\mu$, delta$\mu$, M, r, and vf are made available. With respect to determining these variables, reference is made to the description of blocks 306, 307, 308, 310, 401, 402, and 403. A step 502 follows step 501 in that two threshold values vr and vk are determined. In this regard, reference is made to the description of blocks 404 and 405.

Subsequent to step 502, a step 503 is executed, in which the smaller of two threshold values vr and vk is determined as comparison value vmax. In subsequent step 504, vehicle speed vf is compared with comparison variable vmax. Reference is made at this point to the description of block 406. However, in FIG. 5 variable vred is not depicted. If vehicle speed vf is smaller than comparison variable vmax, then subsequent to step 504, step 501 is once again executed. This corresponds to the assignment of value FALSE to variable vred. On the other hand, if it is determined in step 504 that the vehicle speed is greater than comparison variable vmax, then subsequent to step 504 a step 505 is executed. In the step, retarder intervention (or measures) and/or engine interventions and/or braking interventions are carried out so that the vehicle speed is reduced and therefore the vehicle is stabilized. In FIG. 5 the depiction of the control signals for the components discussed above individually was left out.

Subsequent to step 505, step 501 is executed once again.

In conclusion, it should be noted, first of all, that the form of the exemplary embodiment selected in the description as well as the depiction selected in the Figures is not to represent any limiting effect on the idea essential to the invention. Secondly, several points should be summarized once again: using the method according to the invention, in addition to the skidding behavior of the vehicle on a flat surface the rolling motion of the vehicle about a vehicle axis oriented in longitudinal direction of the vehicle is also determined. This rolling motion can be powerful in varying degrees depending on the load condition of the vehicle and the road surface, and under certain circumstances can lead to the overturning of the vehicle. The method and the device according to an exemplary embodiment of the invention are conceived such that the sensory mechanism necessary for this purpose, in combined vehicle arrangements, are arranged combinations, are accommodated in the tractor.

What is claimed is:

1. A method for stabilizing a vehicle, the method comprising the steps of:

determining at least one of a torsion variable, which corresponds to a vehicle behavior that occurs in reaction to at least one of a force and a transverse force operating on the vehicle with respect to a vehicle axis oriented in a longitudinal direction of the vehicle, and a load-shift variable, which corresponds to a load behavior of a load associated with the vehicle that occurs in reaction to the at least one of the force and the transverse force operating on the vehicle, wherein the vehicle behavior corresponds to the vehicle being at least one of turned, twisted and displaced about the vehicle axis and the load behavior corresponds to the load being at least one of moved, shifted and displaced;

determining a speed variable that corresponds to a vehicle speed;

determining at least one threshold value based on at least one of the torsion variable and the load-shift variable;

comparing the speed variable and the at least one threshold value and providing a comparison result; and based on the comparison result, intervening in a vehicle operation to avoid at least one of overturning the vehicle about the vehicle axis and sliding the vehicle in a transverse direction.

2. The method of claim 1, wherein the torsion variable is determined based on a mass variable corresponding to a vehicle mass.

3. The method of claim 1, further comprising the step of determining a mass variable based on a motive force acting on the vehicle and at least one wheel speed, wherein the at least one threshold value for the vehicle speed is determined based on the mass variable.

4. The method of claim 1, further comprising at least one of the steps of:

(a) determining a mass variable; and (b) determining a volume of the load based on one of the mass variable and a variable corresponding to a form of a vehicle load device, wherein if the load is a fluid load, then the volume is determined during one of a loading and unloading of the vehicle load device;

wherein the load-shift variable is determined based on at least one of the mass variable and the volume.

5. The method of claim 1, wherein in the step of intervening, if the speed variable is greater than the at least one threshold value, then the vehicle speed is reduced by intervening in at least one of a retarder operation, an engine operation and a braking operation so that the speed variable is reduced below the at lest one threshold value.

6. The method of claim 1, further comprising the step of selecting a smaller one of a first threshold value and a second threshold value, which are the at least one threshold value, for comparing to the speed variable, wherein at least one of the first threshold value and the second threshold value corresponds to one of a vehicle overturning risk and a vehicle sliding risk.

7. The method of claim 6, further comprising one of the steps of:

(a) determining at least one friction variable corresponding to friction conditions between at least one vehicle tire and a road surface, wherein the at least one threshold value is determined based on the at least one friction variable; and (b) determining a first friction variable corresponding to a current friction value and a second friction variable corresponding to a difference in frictional values of each side of the vehicle, wherein the at least one threshold value is determined based on at least one of the first friction variable and the second friction variable.

8. The method of claim 6, further comprising at least one of the steps of:

determining a first height variable, which corresponds to a distance between a center of gravity of the vehicle and a road surface, based on at least one wheel speed variable; and determining a second height variable, which corresponds to a distance between the road surface and the vehicle axis, based on a mass variable corresponding to a vehicle mass;

wherein the at least one threshold value is determined based on at least one of the first height variable and the second height variable.

9. The method of claim 1, further comprising one of the following steps of:

determining a path variable corresponding to a radius of a path being driven by the vehicle; and determining the path variable based on at least one of the speed variable and a steering angle variable corresponding to a steering angle of the vehicle;

wherein the at least one threshold value is determined based on the path variable.

10. A device for stabilizing a vehicle, comprising:

means for determining at least one of a torsion variable, which corresponds to a vehicle behavior that occurs in reaction to at least one of a force and a transverse force operating on the vehicle with respect to a vehicle axis oriented in a longitudinal direction of the vehicle, and a load-shift variable, which corresponds to a load behavior of a load associated with the vehicle that occurs in reaction to the at least one of the force and the transverse force operating on the vehicle, wherein the vehicle behavior corresponds to the vehicle being at least one of turned, twisted and displaced about the vehicle axis and the load behavior corresponds to the load being at least one of moved, shifted and displaced;

means for determining a speed variable that corresponds to a vehicle speed;

means for determining at least one threshold value based on at least one of the torsion variable and the load-shift variable;

means for comparing the speed variable and the at least one threshold value and providing a comparison result; and means for intervening in a vehicle operation, based on the comparison result, to avoid at least one of overturning the vehicle about the vehicle axis and sliding the vehicle in a transverse direction.

* * * * *

UNITED STATES PATENT AND TRADEMARK OFFICE
CERTIFICATE OF CORRECTION

PATENT NO.   : 6,324,447 B1
DATED        : November 27, 2001
INVENTOR(S)  : Schramm et al.

It is certified that error appears in the above-identified patent and that said Letters Patent is hereby corrected as shown below:

<u>Column 2,</u>
Line 56, change "displacement," to -- displacement --

<u>Column 9,</u>
Line 33, change "about" to -- with respect to --

<u>Column 10,</u>
Line 6, change "Boscht" to -- Bosch --

<u>Column 15,</u>
Line 13, change "lest" to -- least --

Signed and Sealed this

Fourth Day of February, 2003

JAMES E. ROGAN
*Director of the United States Patent and Trademark Office*